(12) United States Patent
Wang et al.

(10) Patent No.: US 12,058,722 B2
(45) Date of Patent: Aug. 6, 2024

(54) SIDELINK COMMUNICATION USING UPLINK RESOURCES

(71) Applicant: QUALCOMM Incorporated, San Diego, CA (US)

(72) Inventors: Xiaojie Wang, Hillsborough, NJ (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 17/654,003

(22) Filed: Mar. 8, 2022

(65) Prior Publication Data

US 2023/0292353 A1  Sep. 14, 2023

(51) Int. Cl.
*H04W 72/542* (2023.01)
*H04L 1/1812* (2023.01)
*H04W 24/08* (2009.01)
*H04W 72/1268* (2023.01)
*H04W 72/23* (2023.01)
*H04W 72/566* (2023.01)

(52) U.S. Cl.
CPC ......... *H04W 72/542* (2023.01); *H04L 1/1812* (2013.01); *H04W 24/08* (2013.01); *H04W 72/1268* (2013.01); *H04W 72/23* (2023.01); *H04W 72/566* (2023.01)

(58) Field of Classification Search
CPC . H04W 72/542; H04W 72/566; H04W 72/23; H04W 24/08; H04W 72/1268; H04L 1/1812
See application file for complete search history.

(56) References Cited

U.S. PATENT DOCUMENTS

| | | | |
|---|---|---|---|
| 2020/0296738 A1* | 9/2020 | Inokuchi | H04W 72/21 |
| 2020/0351855 A1* | 11/2020 | Kung | H04L 1/1887 |
| 2021/0136731 A1* | 5/2021 | Li | H04W 28/0278 |
| 2021/0168826 A1* | 6/2021 | Zhao | H04L 5/0044 |
| 2021/0321367 A1* | 10/2021 | Zhang | H04W 72/02 |
| 2021/0385853 A1* | 12/2021 | Wang | H04L 5/0055 |
| 2022/0116916 A1* | 4/2022 | Zhao | H04W 72/02 |
| 2022/0167362 A1* | 5/2022 | Liu | H04W 72/542 |
| 2022/0210801 A1* | 6/2022 | Xu | H04W 72/21 |
| 2022/0248421 A1* | 8/2022 | He | H04W 72/02 |
| 2022/0312438 A1* | 9/2022 | Yi | H04W 72/1263 |
| 2022/0338205 A1* | 10/2022 | Lee | H04W 72/56 |
| 2022/0346112 A1* | 10/2022 | Lin | H04W 72/1263 |
| 2022/0361213 A1* | 11/2022 | Hosseini | H04L 5/0098 |
| 2023/0224948 A1* | 7/2023 | Elazzouni | H04L 1/1825 370/329 |
| 2023/0284232 A1* | 9/2023 | Wang | H04W 72/569 370/329 |
| 2023/0292353 A1* | 9/2023 | Wang | H04L 1/1887 |

* cited by examiner

*Primary Examiner* — Michael J Moore, Jr.
(74) *Attorney, Agent, or Firm* — Guang Yu Zhang; Harrity & Harrity, LLP

(57) ABSTRACT

Various aspects of the present disclosure generally relate to wireless communication. In some aspects, a user equipment (UE) may receive configuration information, the configuration information indicating that the UE may use one or more uplink grants for a sidelink communication. The UE may receive scheduling information indicating an uplink grant, of the one or more uplink grants, of uplink resources for an uplink communication of the UE. The UE may transmit, to another LIE and via a sidelink, the sidelink communication using the uplink resources. Numerous other aspects are described.

30 Claims, 13 Drawing Sheets

SIDELINK COMMUNICATION USING UPLINK RESOURCES

FIELD OF THE DISCLOSURE

Aspects of the present disclosure generally relate to wireless communication and to techniques and apparatuses for sidelink communication using uplink resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving configuration information, the configuration information indicating that the UE may use one or more uplink grants for a sidelink communication. The method may include receiving scheduling information indicating an uplink grant, of the one or more uplink grants, of uplink resources for an uplink communication of the UE. The method may include transmitting, to another UE and via a sidelink, the sidelink communication using the uplink resources.

Some aspects described herein relate to a method of wireless communication performed by a network entity. The method may include transmitting configuration information, the configuration information indicating that a UE may use one or more uplink grants for a sidelink communication. The method may include transmitting scheduling information indicating an uplink grant, of the one or more uplink grants, of uplink resources for an uplink communication of the UE. The method may include determining that the UE used the uplink grant for the sidelink communication. The method may include transmitting, based at least in part on determining that the UE used the uplink grant for the sidelink communication, a second grant.

Some aspects described herein relate to a UE for wireless communication. The user equipment may include a memory and one or more processors coupled to the memory. The one or more processors may be configured to receive configuration information, the configuration information indicating that the UE may use one or more uplink grants for a sidelink communication. The one or more processors may be configured to receive scheduling information indicating an uplink grant, of the one or more uplink grants, of uplink resources for an uplink communication of the UE. The one or more processors may be configured to transmit, to another UE and via a sidelink, the sidelink communication using the uplink resources.

Some aspects described herein relate to a network entity for wireless communication. The network entity may include a memory and one or more processors coupled to the memory. The one or more processors may be configured to transmit configuration information, the configuration information indicating that a UE may use one or more uplink grants for a sidelink communication. The one or more processors may be configured to transmit scheduling information indicating an uplink grant, of the one or more uplink grants, of uplink resources for an uplink communication of the UE. The one or more processors may be configured to determine that the UE used the uplink grant for the sidelink communication. The one or more processors may be configured to transmit, based at least in part on determining that the UE used the uplink grant for the sidelink communication, a second grant.

Some aspects described herein relate to a non-transitory computer-readable medium that stores a set of instructions for wireless communication by a UE. The set of instructions, when executed by one or more processors of the UE, may cause the UE to receive configuration information, the configuration information indicating that the UE may use one or more uplink grants for a sidelink communication. The set of instructions, when executed by one or more processors of the UE, may cause the UE to receive scheduling information indicating an uplink grant, of the one or more uplink grants, of uplink resources for an uplink communication of the UE. The set of instructions, when executed by one or more processors of the UE, may cause the UE to transmit, to another UE and via a sidelink, the sidelink communication using the uplink resources.

Some aspects described herein relate to a non-transitory computer-readable medium that stores a set of instructions for wireless communication by a network entity. The set of instructions, when executed by one or more processors of the network entity, may cause the network entity to transmit configuration information, the configuration information indicating that a UE may use one or more uplink grants for a sidelink communication. The set of instructions, when executed by one or more processors of the network entity, may cause the network entity to transmit scheduling information indicating an uplink grant, of the one or more uplink grants, of uplink resources for an uplink communication of the UE. The set of instructions, when executed by one or more processors of the network entity, may cause the network entity to determine that the UE used the uplink grant for the sidelink communication. The set of instructions, when executed by one or more processors of the network entity, may cause the network entity to transmit, based at least in part on determining that the UE used the uplink grant for the sidelink communication, a second grant.

Some aspects described herein relate to an apparatus for wireless communication. The apparatus may include means for receiving configuration information, the configuration information indicating that the UE may use one or more uplink grants for a sidelink communication. The apparatus may include means for receiving scheduling information indicating an uplink grant, of the one or more uplink grants, of uplink resources for an uplink communication of the UE. The apparatus may include means for transmitting, to another UE and via a sidelink, the sidelink communication using the uplink resources.

Some aspects described herein relate to an apparatus for wireless communication. The apparatus may include means for transmitting configuration information, the configuration information indicating that a UE may use one or more uplink grants for a sidelink communication. The apparatus may include means for transmitting scheduling information indicating an uplink grant, of the one or more uplink grants, of uplink resources for an uplink communication of the UE. The apparatus may include means for determining that the UE used the uplink grant for the sidelink communication. The apparatus may include means for transmitting, based at least in part on determining that the UE used the uplink grant for the sidelink communication, a second grant.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
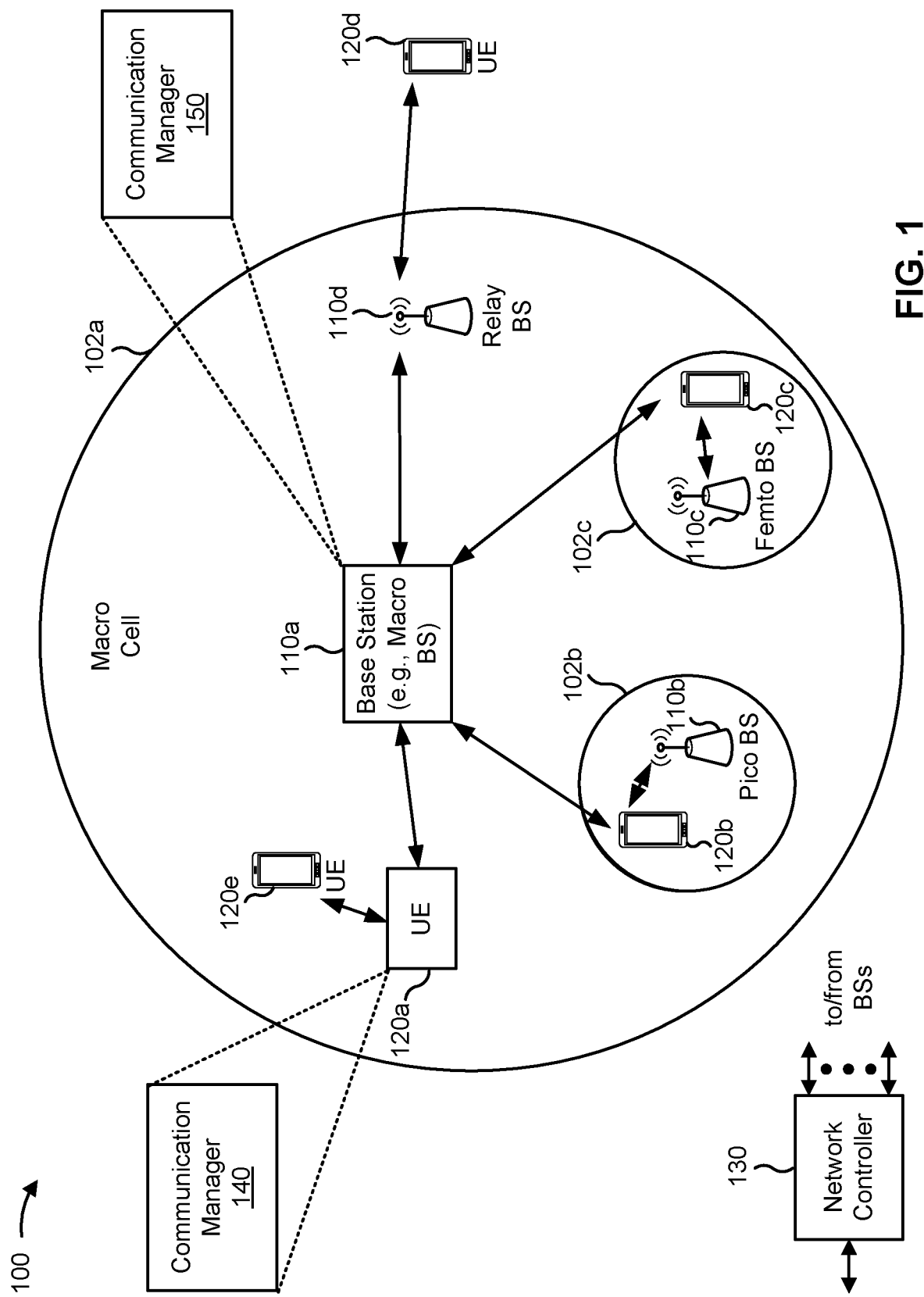
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a centralized unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive configuration information, the configuration information indicating that the UE may use one or more uplink grants for a sidelink communication; receive scheduling information indicating an uplink grant, of the one or more uplink grants, of uplink resources for an uplink communication of the UE; and transmit, to another UE and via a sidelink, the sidelink communication using the uplink resources. Additionally, or alternatively, the communication manager 140 may perform one or more other operations described herein.

In some aspects, the network entity (e.g., base station 110) may include a communication manager 150. As described in more detail elsewhere herein, the communication manager 150 may transmit configuration information, the configuration information indicating that a UE may use one or more uplink grants for a sidelink communication; transmit scheduling information indicating an uplink grant, of the one or more uplink grants, of uplink resources for an uplink communication of the UE; determine that the UE used the uplink grant for the sidelink communication; and transmit, based at least in part on determining that the UE used the uplink grant for the sidelink communication, a second grant. Additionally, or alternatively, the communication manager 150 may perform one or more other operations described herein.

As indicated above, FIG. 1 is provided as an example. Other examples may differ from what is described with regard to FIG. 1.

Figure 2:
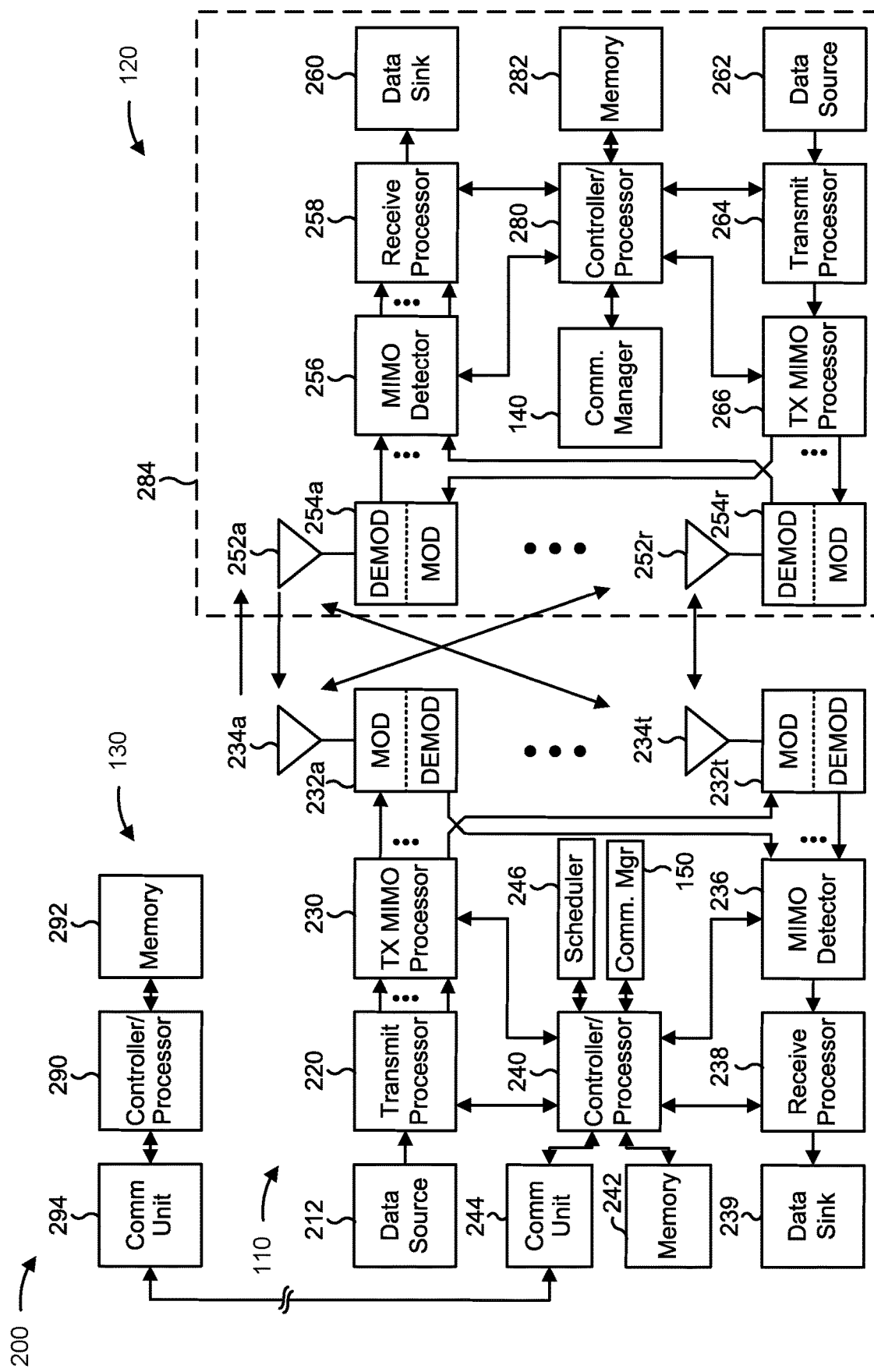
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the ULE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-13).

The controller/processor 240 of the base station 110, the controller/processor 280 of the UE 120, and/or any other component(s) of FIG. 2 may perform one or more techniques associated with sidelink communication using uplink resources, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE includes means for receiving configuration information, the configuration information indicating that the UE may use one or more uplink grants for a sidelink communication; means for receiving scheduling information indicating an uplink grant, of the one or more uplink grants, of uplink resources for an uplink communication of the UE; and/or means for transmitting, to another UE and via a sidelink, the sidelink communication using the uplink resources. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity includes means for transmitting configuration information, the configuration information indicating that a UE may use one or more uplink grants for a sidelink communication; means for transmitting scheduling information indicating an uplink grant, of the one or more uplink grants, of uplink resources for an uplink communication of the UE; means for determining that the UE used the uplink grant for the sidelink communication; and/or means for transmitting, based at least in part on determining that the UE used the uplink grant for the sidelink communication, a second grant. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
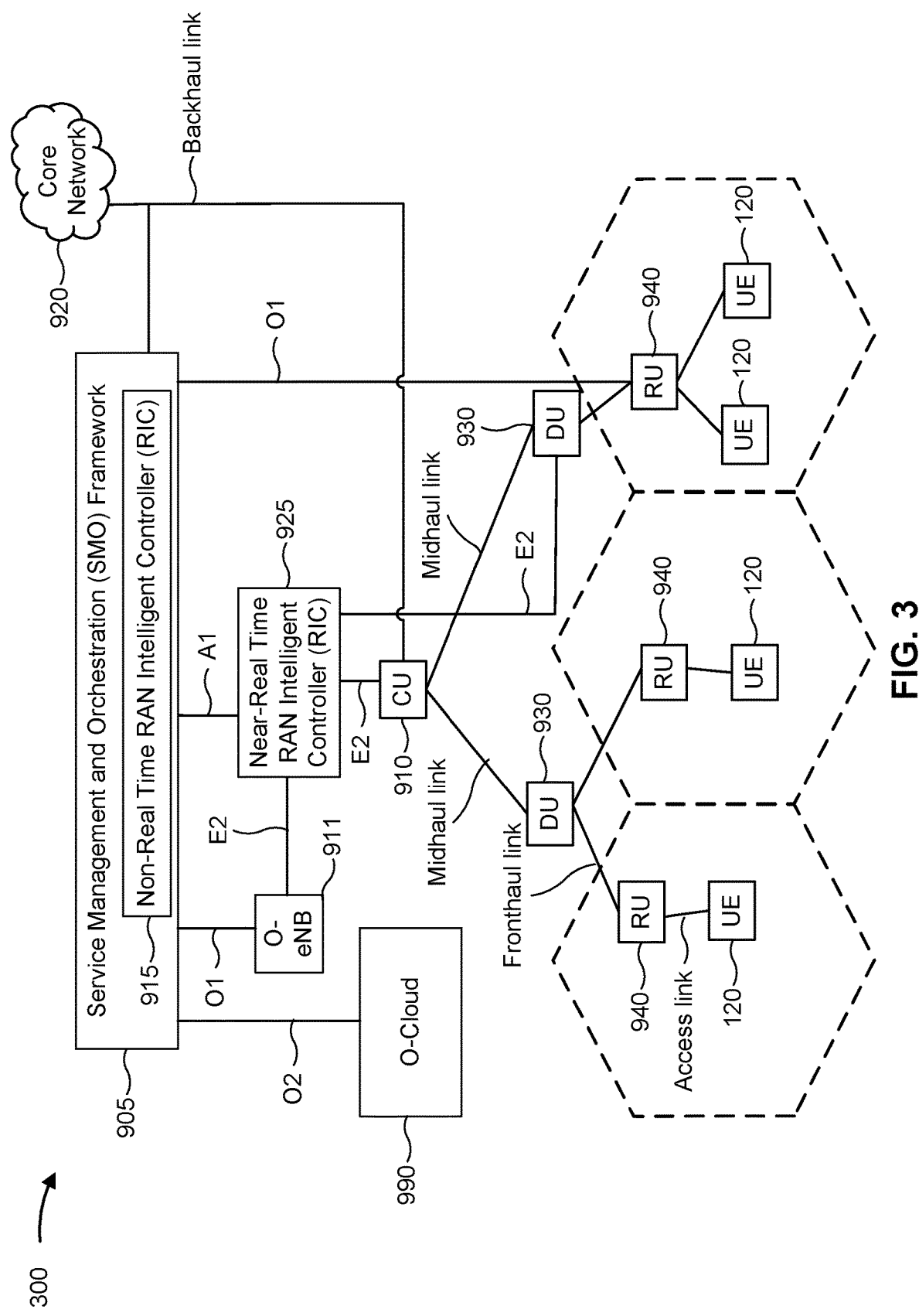
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as through F1 interfaces. Each of the DUs 330 may communicate with one or more RUs 340 via respective fronthaul links. Each of the RUs 340 may communicate with one or more UEs 120 via respective RF access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an Open RAN (O-RAN) configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which may also be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts radio frequency (RF) processing functions or low-PHY layer functions, such as performing an FFT, performing an iFFT, digital beamforming, or PRACH extraction and filtering, among other examples, based at least in part on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface).

For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
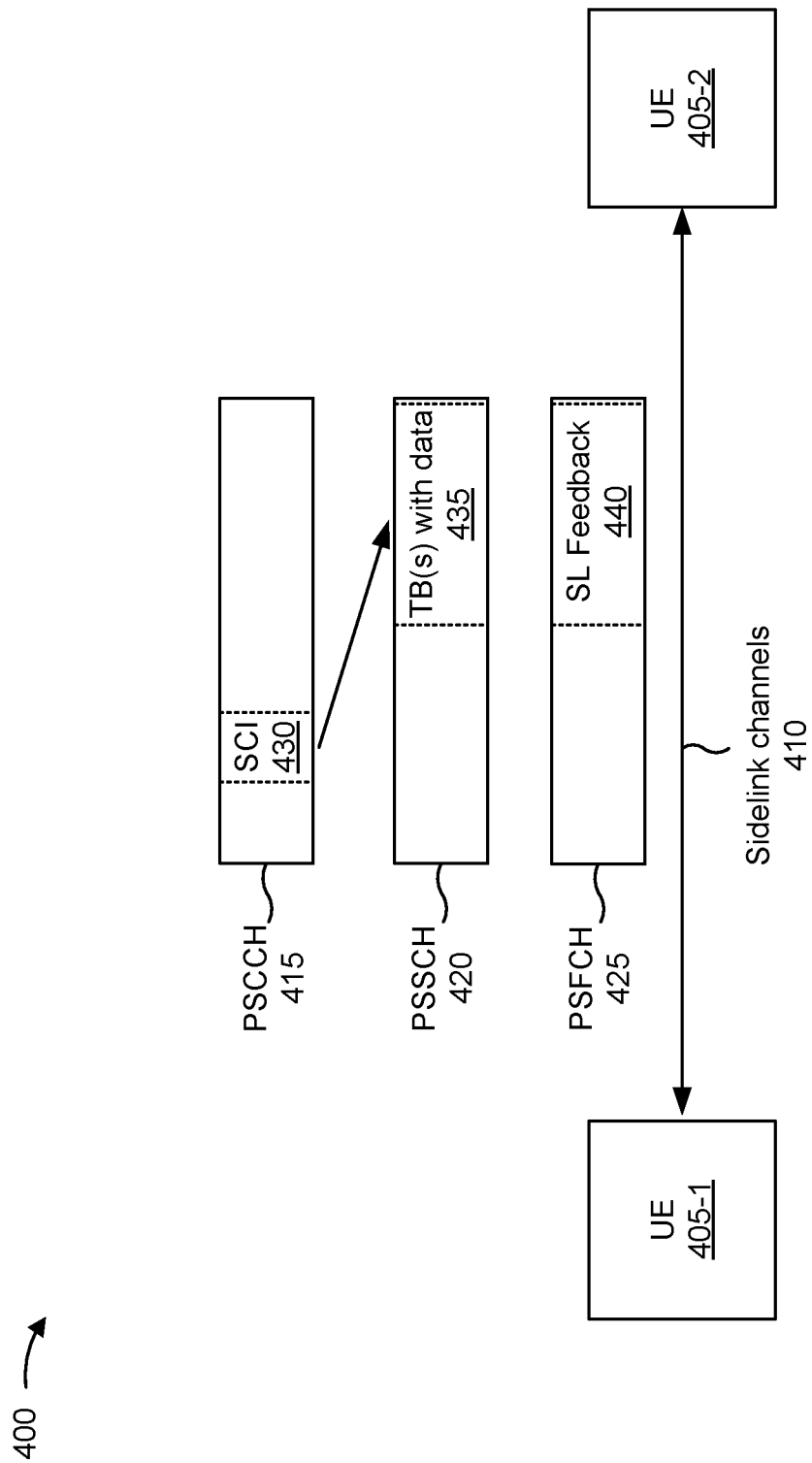
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 420, such as a hybrid automatic repeat request (HARQ) process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a base station 110. For example, the UE 405 may receive a grant (e.g., in downlink control information (DCI) or in a radio resource control (RRC) message, such as for configured grants) from the base station 110 for sidelink channel access and/or scheduling. In some aspects, a UE 405 may operate using a transmission mode (e.g., Mode 2) where resource selection and/or scheduling is performed by the UE 405 (e.g., rather than a base station 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or a modulation and coding scheme (MCS) to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
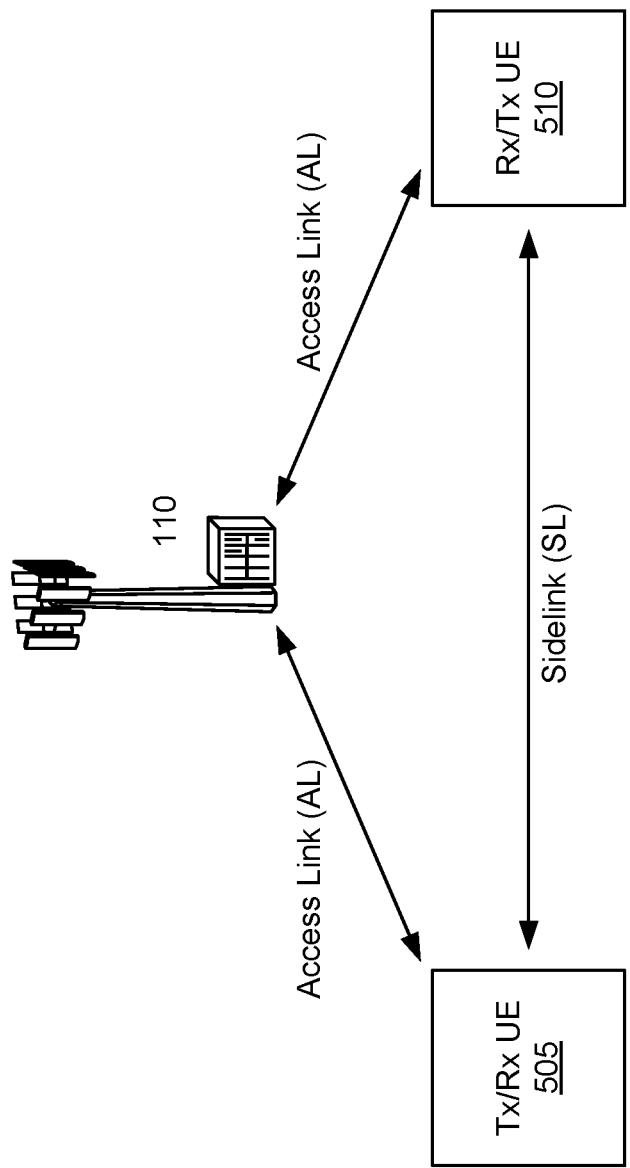
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 5 is provided as an example. Other examples may differ from what is described with respect to FIG. 5.

Figure 6:
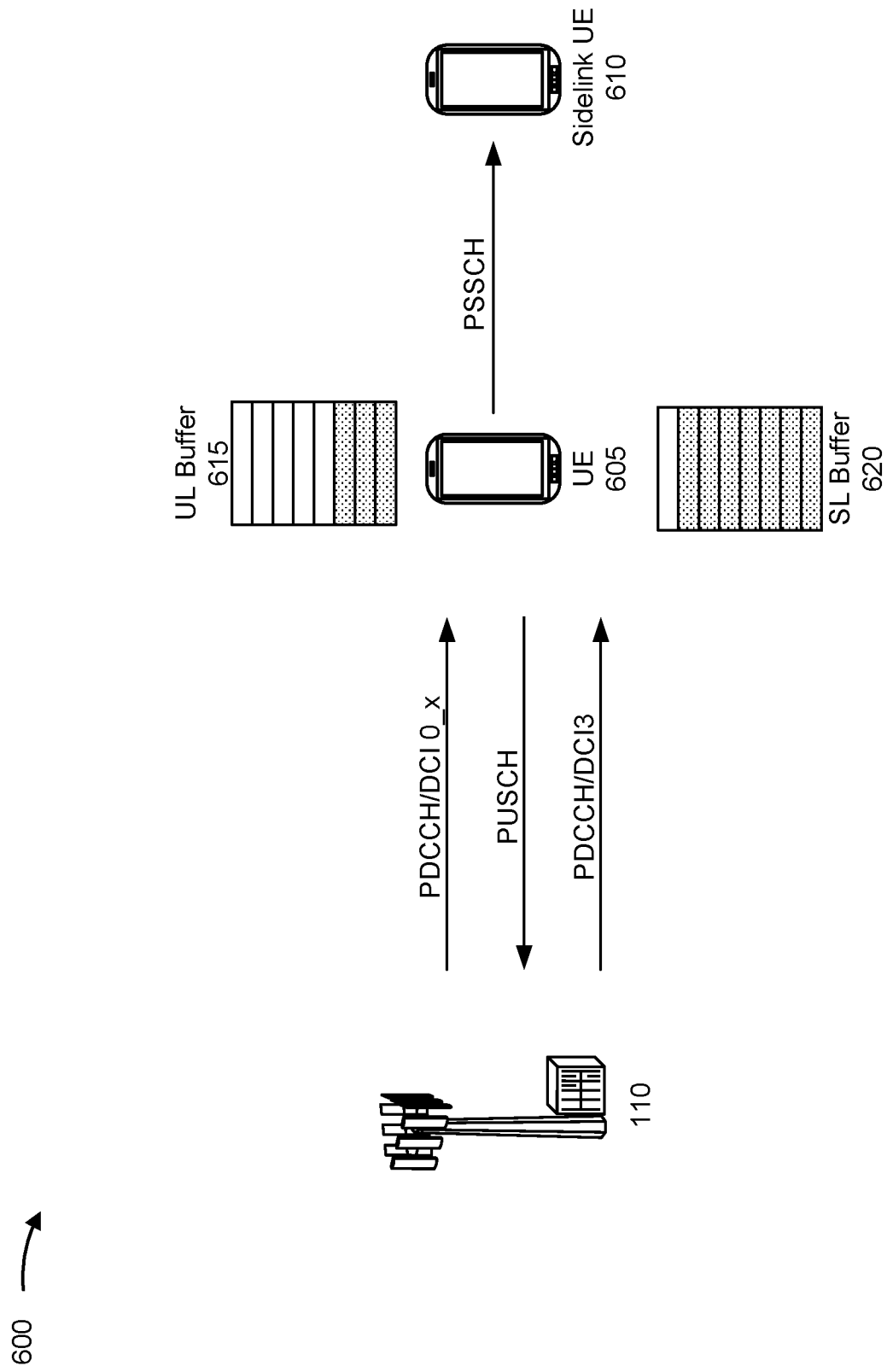
FIG. 6 is a diagram illustrating an example of sidelink transmission scheduling, in accordance with the present disclosure

FIG. 6 is a diagram illustrating an example 600 of sidelink transmission scheduling, in accordance with the present disclosure. As shown in FIG. 6, a base station 110 and a UE 605 (e.g., a UE 120) may communicate with one another, and the UE 605 may communicate with a sidelink UE 610 (e.g., a UE 120) via a sidelink, as described herein.

As shown in FIG. 6, a UE 605 that supports both uplink and sidelink communications may have separately scheduled transmissions. For example, the base station 110 may schedule uplink transmissions for the UE 605 using a physical downlink control channel (PDCCH) message carrying uplink scheduling information (e.g., using RRC and/or a first type of downlink control information (DCI), such as DCI 0_X). The uplink scheduling information may indicate an uplink grant, which specifies resources available to the UE 605 for uplink transmissions. The base station 110 may separately schedule sidelink transmissions for the UE 605 using another PDCCH message carrying sidelink scheduling information (e.g., using RRC and/or a second type of DCI, such as DCI 3). The sidelink scheduling information may indicate a sidelink grant, which specifies resources available to the UE 605 for sidelink transmissions.

In some situations, the UE 605 may have two buffers, or queues, for different transmissions, such as an uplink buffer 615 for uplink transmissions and a sidelink buffer 620 for sidelink transmissions. The UE 605 may use separate buffer status reports (BSRs) to communicate the statuses of these transmission buffers (e.g., to the base station 110). The base station 110 may use information communicated in the BSRs to schedule the uplink and sidelink transmissions for the UE 605.

Scheduling transmissions takes time and introduces latency to communications between devices. The UE 605 may use uplink grants for uplink transmissions, but this may result in lower priority uplink transmissions taking place before higher priority sidelink transmissions, due to the separation in uplink and sidelink transmission scheduling. In some situations, this may result in sidelink transmissions being associated with significant latency, or delay, even for high priority sidelink traffic, such as public safety information.

As indicated above, FIG. 6 is provided as an example. Other examples may differ from what is described with respect to FIG. 6.

Some techniques and apparatuses described herein enable a UE to use uplink resources for sidelink communications. For example, a UE may be configured with one or more conditions that, when satisfied, enable the UE to use uplink resources, identified in an uplink grant, to transmit sidelink communications instead. As a result, the UE may be able to better manage uplink and sidelink transmissions to efficiently prioritize transmissions in a manner that may improve latency and avoid delays for some communications (e.g., time-sensitive communications) while avoiding transmission scheduling conflicts that may waste processing resources, networking resources, and/or the like.

Figure 7:
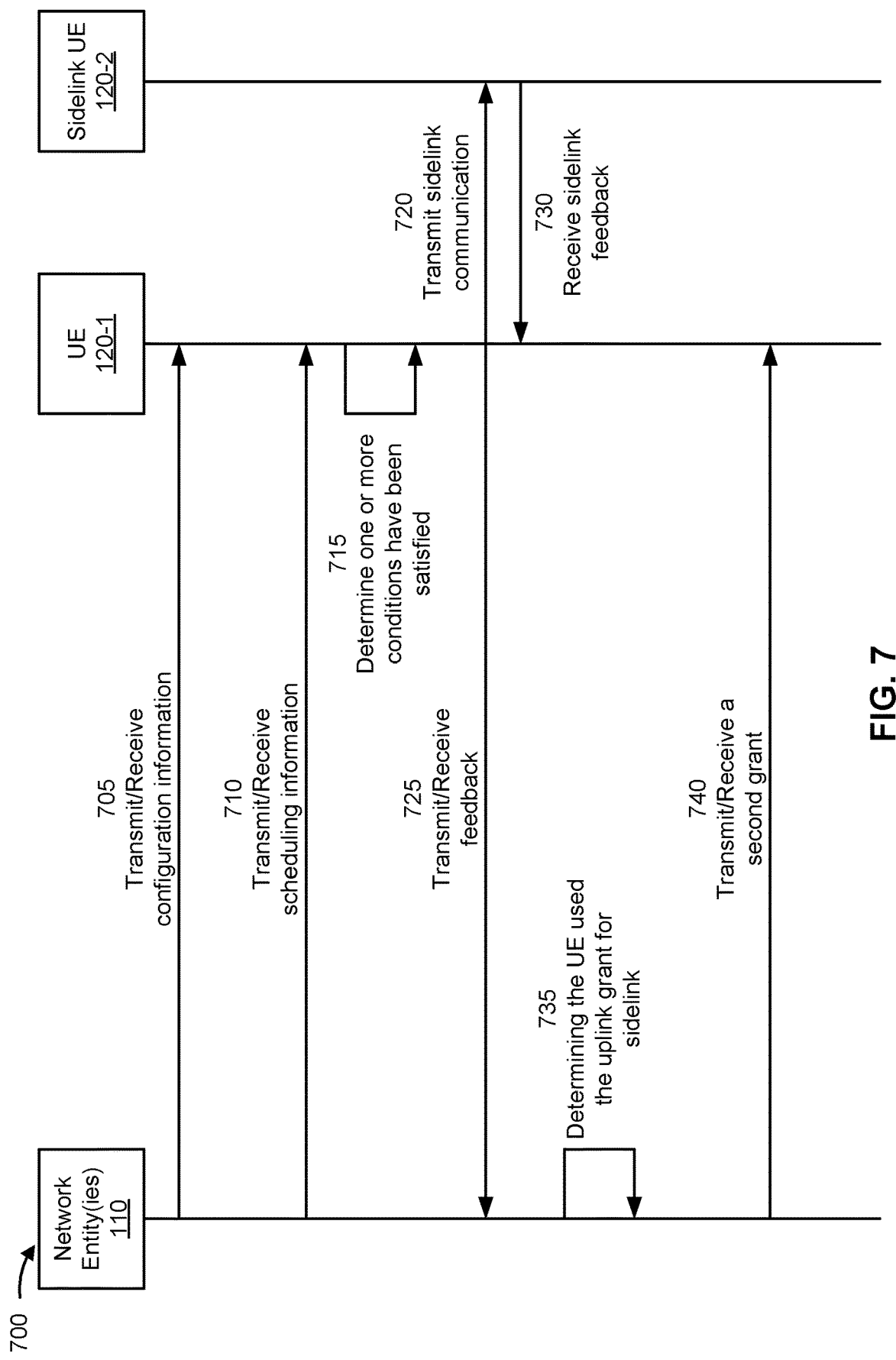
FIG. 7 is a diagram illustrating an example associated with sidelink communication using uplink resources, in accordance with the present disclosure.

FIG. 7 is a diagram of an example 700 associated with sidelink communication using uplink resources, in accordance with the present disclosure. As shown in FIG. 7, a network entity (e.g., base station 110) or network entities may communicate with a UE (e.g., UE 120-1) and a sidelink UE (e.g., UE 120-2). In some aspects, the network entity, the UE, and the sidelink UE may be part of a wireless network (e.g., wireless network 100). The UE and the network entity may have established one or more wireless connections prior to operations shown in FIG. 7.

As shown by reference number 705, the network entity may transmit, and the UE may receive, configuration information. In some aspects, the UE may receive the configuration information via one or more of RRC signaling, one or more medium access control (MAC) control elements (CEs), and/or DCI, among other examples. In some aspects, the configuration information may include an indication of one or more configuration parameters (e.g., already known to the UE and/or previously indicated by the network entity or other network device) for selection by the UE, and/or explicit configuration information for the UE to use to configure the UE, among other examples.

In some aspects, the configuration information may indicate that the UE is permitted to use one or more uplink grants for a sidelink communication, or communications. For example, the configuration information may indicate one or more conditions that should be satisfied to enable the UE to use at least a portion of the uplink resources scheduled by an uplink grant to transmit a sidelink communication (e.g., instead of an uplink communication). In some aspects, the configuration information may include other information to facilitate the use of uplink resources for sidelink communications, such as HARQ process numbers (or HARQ IDs) eligible for use with sidelink communications, and/or feedback resources for the UE to inform the network entity when uplink resources are used for sidelink communications, among other examples. For example, the configuration indication may identify a subset of HARQ process numbers that are reserved for sidelink communication.

The UE may configure itself based at least in part on the configuration information. In some aspects, the UE may be configured to perform one or more operations described herein based at least in part on the configuration information.

As shown by reference number 710, the network entity may transmit, and the UE may receive, scheduling information indicating an uplink grant. The uplink grant may indicate uplink resources to be used for an uplink communication of the UE (e.g., an uplink communication from the UE to the network entity). In some situations, the network entity provides the uplink grant based at least in part on a request and/or BSR provided by the UE. For example, the UE may provide the network entity with a BSR indicating the status of the transmission buffer of the UE, and the network entity may use that information to schedule physical uplink shared channel (PUSCH) resources by which the UE may transmit uplink communications.

In some aspects, the network entity may transmit the scheduling information via PDCCH, and the scheduling information may be included in RRC or DCI. In some aspects, the scheduling information may indicate other information to facilitate the use of uplink resources for sidelink communications, including information similar to that included in the configuration information, such as HARQ process numbers eligible for use with sidelink communications, and/or feedback resources for the UE to inform the network entity when uplink resources are used for sidelink communications, among other examples.

As shown by reference number 715, the UE may determine whether one or more conditions have been satisfied. For example, the UE may determine, prior to using the uplink resources for a sidelink transmission, whether one or more conditions have been satisfied. The one or more conditions may have been indicated by the configuration information, as described herein. In some aspects, at least one of the one or more conditions may be indicated by the scheduling information. For example, the scheduling information may add, remove, and/or modify a condition or conditions, which were previously indicated in the configuration information.

In some aspects, one or more conditions may include that a sidelink priority associated with the sidelink communication satisfies a threshold priority, that the uplink resources are within one slot of sidelink resources for other sidelink communications with the other UE, that the uplink resources are not for re-transmission of the uplink communication, that sidelink packet preparation time satisfies a threshold preparation time, that the uplink resources or the uplink communication have not been indicated as canceled, and/or that the uplink communication does not include a reference signal transmission, among other examples. Any single condition may be used or, in some aspects, any combination of conditions may be used. In some aspects, one or more of the conditions may be associated with a threshold to determine whether each of the one or more conditions is satisfied.

In some aspects, the sidelink priority may be represented by an absolute priority value or type associated with the sidelink communication(s) (e.g., sidelink priority may be based on the sidelink communication being a public safety information transmission, a V2X transmission, an ultra-reliable low latency communication, and/or the like). As another example, sidelink priority may be based at least in part on a status of the sidelink buffer (e.g., sidelink priority may be higher when the sidelink buffer is full and lower when the sidelink buffer is near empty). In some aspects, sidelink priority may be determined by an upper layer traffic priority (e.g., based at least in part on a latency of a packet, whether the packet is sensitive to packet loss, and/or the like). In some aspects, the sidelink priority may be a pair-wise priority, such as a difference between an uplink priority value and sidelink priority value. For example, in a situation where priority is based on buffer status, the sidelink priority may be based at least in part on a difference between the available capacity of the sidelink and uplink buffers (e.g., if a sidelink buffer has 25% available capacity, and the uplink buffer has 40% available capacity, the difference of 15% may indicate the sidelink priority). As another example, a sidelink transmission may have a higher priority than an uplink transmission, such as in a situation where a higher priority transmission (e.g., as determined by the upper layer), such as a basic safety information transmission, may pre-empt (e.g., have a higher priority than) an uplink transmission with a lower traffic priority, such as an uplink transmission for a text message or web browsing. As described here, the sidelink priority may be compared with a threshold to determine whether the condition associated with the sidelink priority is satisfied.

In some aspects, sidelink resources may be a subset of semi-static uplink resources, and a condition may be based at least in part on which uplink resources are scheduled and which resources are scheduled within one slot adjacent to the uplink resources. For example, in some aspects, an uplink resource or resources associated with the uplink grant must be a superset of a sidelink resource or resources to be used for the sidelink transmission, in order to meet the corresponding condition. In other words, a condition of sidelink transmission may only be satisfied if the sidelink transmission may be scheduled within the scheduled uplink resource(s), without extending beyond the uplink resource(s). In some aspects, one of the conditions may be that scheduled uplink resource(s) at least partially overlap with the sidelink resource(s) to be used for the sidelink transmission. For example, within a slot (or across multiple slots), a condition of the sidelink transmission may only be satisfied if the sidelink transmission is scheduled such that the sidelink transmission at least partially overlaps with the uplink resource(s) of that slot (or across multiple slots).

In some aspects, one of the conditions may be that scheduled uplink resource(s) are within a same slot as the sidelink resource(s) to be used for the sidelink transmission, without overlapping in time. For example, within a single slot, uplink resources may be scheduled for a first portion of the slot, and sidelink resources may be transmitted in a second portion of the slot, where the second portion does not overlap with the first portion. In some aspects, one of the conditions may be that the scheduled uplink resource(s) and the sidelink resource(s) to be used for the sidelink transmission are in adjacent slots (but not necessarily overlapping). For example, if a first slot is scheduled for uplink transmission, a second slot that immediately follows the first slot may be used for sidelink transmission. In some aspects, further restrictions may be used to narrow the conditions that must be met to use uplink resources for the sidelink transmission. For example, adjacent slots may only be eligible for sidelink transmission in a situation where the scheduled uplink resource(s) are scheduled at an end of an adjacent slot that has no scheduled sidelink resource.

In some aspects, the one or more conditions may include a condition that the uplink resources are not for re-transmission of an uplink communication. For example, in a situation where the uplink resources are scheduled to enable the UE to re-transmit an uplink communication (e.g., in a situation where a first attempt to transmit the uplink communication at least partially failed), those uplink resources may not be eligible to be used for sidelink transmissions.

In some aspects, the one or more conditions may include a condition that a sidelink packet preparation time satisfies a threshold preparation time. The threshold preparation time may, for example, be based at least in part on an amount of time available prior to the scheduled uplink resources, and the sidelink packet preparation time may be determined by the UE. For example, in some situations, the UE may not be capable of preparing one or more sidelink packets for the sidelink transmission before one or more of the scheduled uplink resources, or within a threshold period of time (e.g., at least one slot or symbol) prior to the scheduled uplink resources. In this situation (e.g., the UE is aware that it will not have the sidelink packet(s) prepared fast enough to use the uplink resources), the UE may not satisfy the condition. In a situation where the UE is capable of preparing the sidelink packets within the threshold time, the UE may satisfy the condition.

In some aspects, the one or more conditions may include a condition that the uplink resources and/or the uplink communication has not been indicated as canceled. For example, in some situations, after scheduling the uplink resources for the uplink communication, the uplink resources and/or uplink communication may be canceled. The cancelation may be based at least in part on data received from the network entity, such as another DCI (e.g., in a situation where the network entity needs to preempt the previously granted uplink resources for another communication) and/or based at least in part on the UE canceling the transmission. In a situation where the uplink resources and/or uplink communication is canceled, the condition may not be satisfied, and the UE may not use the uplink resources for sidelink transmissions.

In some aspects, the one or more conditions may include a condition that the uplink communication does not include a reference signal transmission. For example, if the uplink transmission includes a reference signal (e.g., a demodulation reference signal (DMRS), phase tracking reference signal (PTRS), channel state information reference signal (CSI-RS), sounding reference signal (SRS), and/or the like), the uplink resources for the uplink transmission may not be eligible for use for sidelink transmissions. In some aspects, the condition may specify one or more types of reference signals, and whether the condition is met is based at least in part on which type of reference signal is to be included in the uplink transmission. For example, a condition might specify that an uplink communication does not include an SRS signal, which may result in the condition being met for other reference signals, such as DMRS, PTRS, and/or the like. In other words, the condition that the uplink communication does not include an SRS signal may indicate that SRS signals should not be pre-empted by sidelink traffic, while other reference signals (and/or other communications) may be eligible for pre-emption by sidelink traffic using the uplink resources.

As shown by reference number 720, the UE may transmit the sidelink communication to the sidelink UE using the uplink resources indicated by the scheduling information. In some aspects, the sidelink transmission may be based at least in part on satisfaction of the one or more conditions, as described herein. For example, the UE may only use the uplink resources for the sidelink transmission after determining that the one or more conditions have been satisfied. In some aspects, the UE may cancel the uplink communication (e.g., based at least in part on using the uplink resources for the sidelink transmission).

In some aspects, the sidelink transmission may use resources within one slot of the scheduled uplink resources. For example, as described herein with respect to the one or more conditions, the UE may transmit the sidelink communication using resources that are within a superset of the scheduled uplink resources (e.g., the resources used for the sidelink transmission are completely within the scheduled uplink resources), that partially overlap with the scheduled uplink resources, that are within a same slot as the scheduled uplink resources, and/or that are in slots adjacent to the scheduled uplink resources, among other examples described herein.

In some aspects, the UE may determine a HARQ process number for the sidelink communication and transmit the communication in association with the HARQ process number. For example, the sidelink transmission may include data identifying the HARQ process number to be used for HARQ feedback. In some aspects, the UE may determine the HARQ process number based at least in part on a HARQ indication included in the configuration information and/or the scheduling information. For example, the UE may have a preconfigured HARQ process number for sidelink communications and/or may be provided with a HARQ process number in the scheduling information. In some aspects, the UE may reserve a set of HARQ process numbers for sidelink communications, and the HARQ process number used for the sidelink transmission may be determined from the reserved set of HARQ process numbers. As described herein, HARQ process numbers may be reserved based at least in part on configuration information and/or scheduling information provided by the network entity.

In some aspects, the UE may transmit, and the network entity may receive, data indicating the HARQ process number. The data indicating the HARQ process number may be included in feedback, as described with respect to reference number 725, or in a separate communication. In some aspects, the UE may transmit, and the network entity may receive, a request for resources to be used for sidelink HARQ feedback for the sidelink communication. For example, the request may be included in the feedback described with respect to reference number 725, or in a separate communication. In some aspects, the network entity may transmit, and the UE may receive, data indicating the HARQ resources to be used for the sidelink HARQ feedback.

As shown by reference number 725, the UE may transmit, and the network entity may receive, feedback indicating that the uplink grant is used for the sidelink communication. The feedback enables the UE to notify the network entity that the UE received the uplink grant but will not be using the corresponding uplink resources to transmit the uplink communication. This may enable the network entity to take various actions, including rescheduling uplink resources for the uplink communication.

In some aspects, the network entity may transmit, and the UE may receive, data indicating feedback resources for the UE to provide the feedback indicating that the uplink resources were used for the sidelink communication. For example, the feedback resources may be indicated in the configuration information, the scheduling information, or another communication.

As shown by reference number 730, the UE may receive sidelink feedback from the sidelink UE. For example, the sidelink feedback may include data to be transmitted to the network entity by the UE on the sidelink UE's behalf, such as sidelink HARQ feedback. The UE may, after receiving the sidelink feedback, transmit sidelink feedback to the network entity, as needed (e.g., for a sidelink HARQ process).

As shown by reference number 735, the network entity may determine that the UE used the uplink grant for the sidelink communication. In some aspects, the network entity may make the determination based at least in part on the feedback, received from the UE, indicating that the uplink resources were used for the sidelink transmission.

In some aspects, the network entity may infer that the uplink grant was used for a sidelink transmission. For example, in some aspects, the network entity may measure a signal strength (e.g., reference signal received power (RSRP)) associated with the uplink resources and determine that the UE used the uplink grant for the sidelink communication based at least in part on the signal strength. In this situation, the network entity may expect an RSRP of an uplink transmission to be within a certain RSRP threshold, and an unusually different (e.g., unusually low) RSRP may indicate that the UE did not transmit in a direction associated with the uplink transmission, and transmitted in a different direction and/or at a different power to reach the sidelink UE. As another example, in some aspects, the network entity may attempt to decode the sidelink transmission (e.g., assuming that the sidelink transmission is an uplink communication, based on the sidelink transmission being received using the scheduled uplink resources) and, based on the attempt to decode the sidelink transmission, the network entity may determine that the UE used the uplink grant for the sidelink transmission. For example, if the network entity fails to decode the received transmission, the network entity may assume that it is due to the transmission being encoded for another device (e.g., the sidelink UE).

As shown by reference number 740, the network entity may transmit, and the UE may receive, a second grant. In some aspects, the network entity may transmit the second grant based at least in part on determining that the UE used the uplink grant for the sidelink transmission.

In some aspects, the second grant includes a sidelink grant for further sidelink communication. For example, the second grant may be associated with a sidelink HARQ feedback process or for other communications with the sidelink UE. In some aspects, the second grant includes another uplink grant for re-transmission of the uplink communication. For example, because the initial uplink grant was used for a sidelink transmission, the uplink communication associated with the initial uplink grant may not have occurred, and the UE may still need to transmit the uplink communication. Accordingly, the network entity may use the other uplink grant for retransmission of the uplink communication.

Note that while various portions of example 700 are depicted as occurring in a particular order, the order in which they occur may vary. For example, the UE may transmit feedback prior to transmitting the sidelink communication, the sidelink feedback may be received before the UE transmits feedback or after the network entity determines that the UE used the uplink grant for the sidelink communication, and/or the network entity may makes its determination before the UE transmits the sidelink communication, among other examples.

As indicated above, FIG. 7 is provided as an example. Other examples may differ from what is described with regard to FIG. 7.

Figure 8:
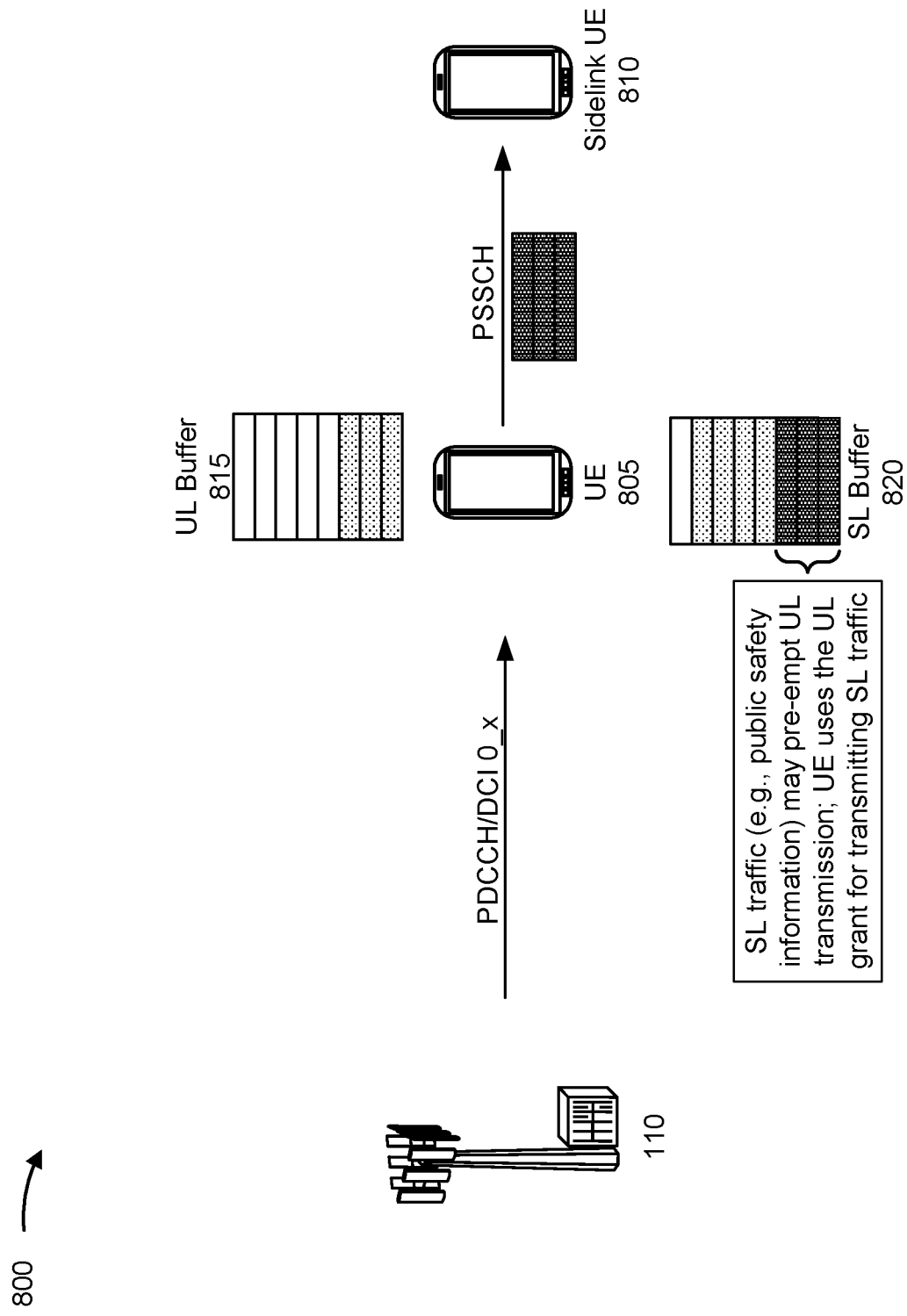
FIG. 8 is a diagram illustrating an example associated with pre-empting an uplink transmission for a sidelink transmission, in accordance with the present disclosure.

FIG. 8 is a diagram illustrating an example 800 associated with pre-empting an uplink transmission for a sidelink transmission, in accordance with the present disclosure. As shown in FIG. 8, a base station 110 and a UE 805 (e.g., a UE 120) may communicate with one another, and the UE 805 may communicate with a sidelink UE 810 (e.g., a UE 120) via a sidelink, as described herein.

For example, the UE 805 may have uplink transmissions in an uplink buffer 815 and sidelink transmissions in a sidelink buffer 820. As indicated, some of the sidelink transmissions in the sidelink buffer 820 may have a higher priority than the uplink transmissions in the uplink buffer 815. In this situation, the UE 805 may be configured with a condition that specifies that the UE 805 is to use uplink resources of an uplink grant for sidelink transmissions when the priority of the sidelink transmissions exceeds the priority of the uplink transmissions. Accordingly, when the UE 805 receives DCI scheduling uplink resources for an uplink transmission via PDCCH, the UE 805 transmits the higher priority sidelink transmissions to the sidelink UE 810 using the uplink resources, rather than using the uplink resources for the uplink transmission.

As indicated above, FIG. 8 is provided as an example. Other examples may differ from what is described with respect to FIG. 8.

Figure 9:
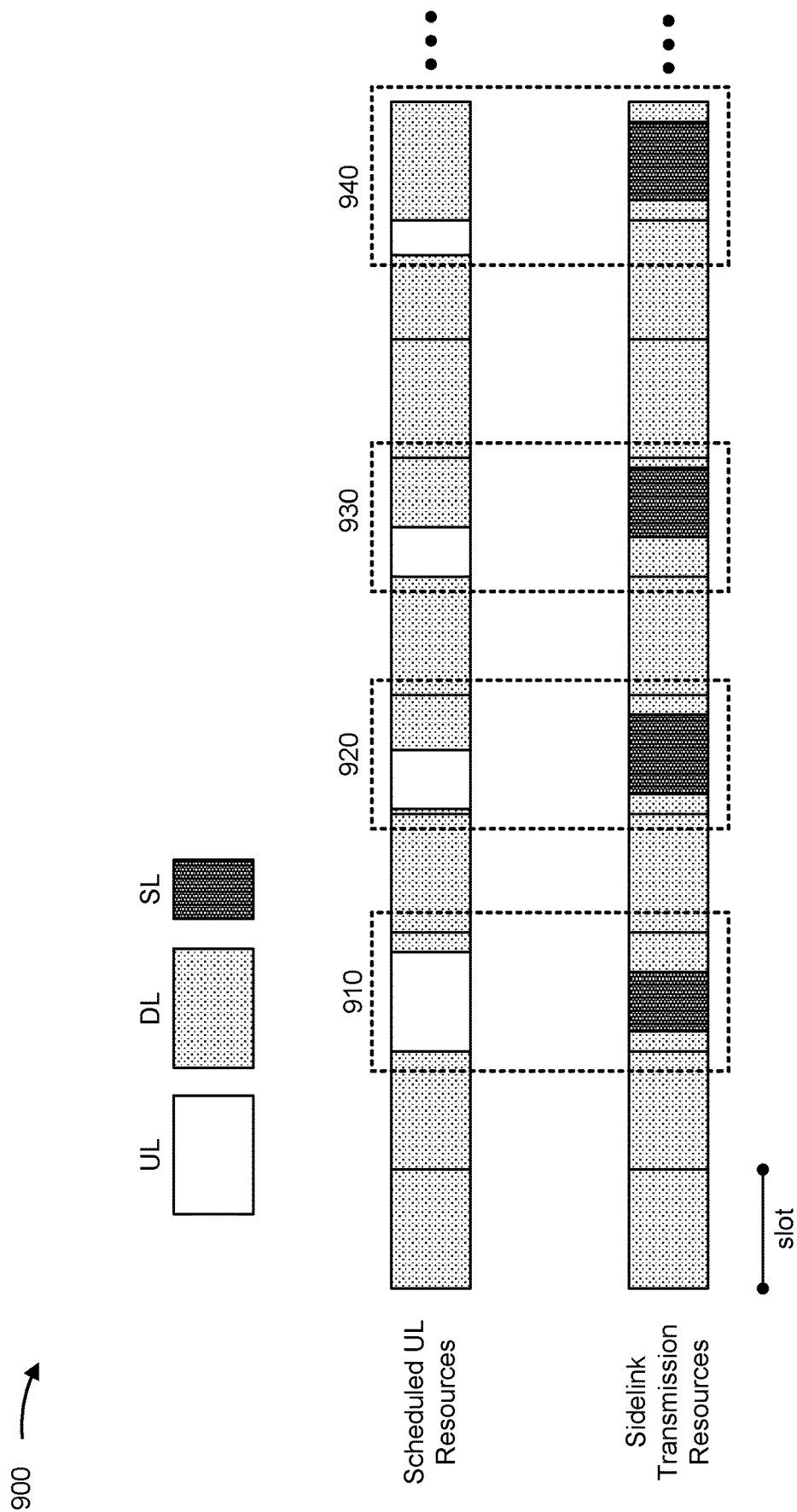
FIG. 9 is a diagram illustrating an example associated with slot timing for using uplink resources for sidelink transmissions, in accordance with the present disclosure.

FIG. 9 is a diagram illustrating an example 900 associated with slot timing for using uplink resources for sidelink transmissions, in accordance with the present disclosure. As shown in FIG. 9, communication resources (e.g., time resources) are depicted, where slots shown in white are scheduled uplink resources, such as uplink resources scheduled by an uplink grant included in scheduling information (e.g., DCI) received by a UE (e.g., UE 120); slots shown in a sparse pattern fill are non-scheduled, or downlink resources; and slots shown in a dense pattern fill are sidelink resources used for sidelink transmissions, as described herein. The scheduled uplink resources, shown on top of example 900, depict the uplink resources that were scheduled by the uplink grant, while the sidelink transmission resources, shown on the bottom of example 900, depict examples of different ways in which the sidelink resources may be used for sidelink transmission when the scheduled uplink resources are used for the sidelink transmissions. The depicted example also illustrates how the UE may determine whether one or more conditions are satisfied to enable the sidelink transmissions to use the uplink resources, as described herein.

As shown by reference number 910, in some situations, the sidelink resources are a subset of the uplink resources or, stated differently, the uplink resources are a superset of the sidelink resources. In this example, the sidelink transmission occurs entirely with the scheduled uplink resources.

As shown by reference number 920, the sidelink resources at least partially overlap with the scheduled uplink resources within a slot. In this example, the sidelink transmission occurs within the same slot as the scheduled uplink resources, though not necessarily completely overlapping, such that at least some of the symbols used for the sidelink transmission were not scheduled for the uplink transmission.

As shown by reference number 930, the sidelink resources are within the same slot as the uplink resources, though they do not otherwise overlap. In this example, the sidelink transmission uses the same slot as the uplink transmission, but not the same symbols.

As shown by reference number 940, the sidelink resources are within a slot adjacent to the scheduled uplink resources. In this example, the sidelink transmission uses resources in a slot following the slot in which the uplink transmission is scheduled.

As indicated above, FIG. 9 is provided as an example. Other examples may differ from what is described with respect to FIG. 9.

Figure 10:
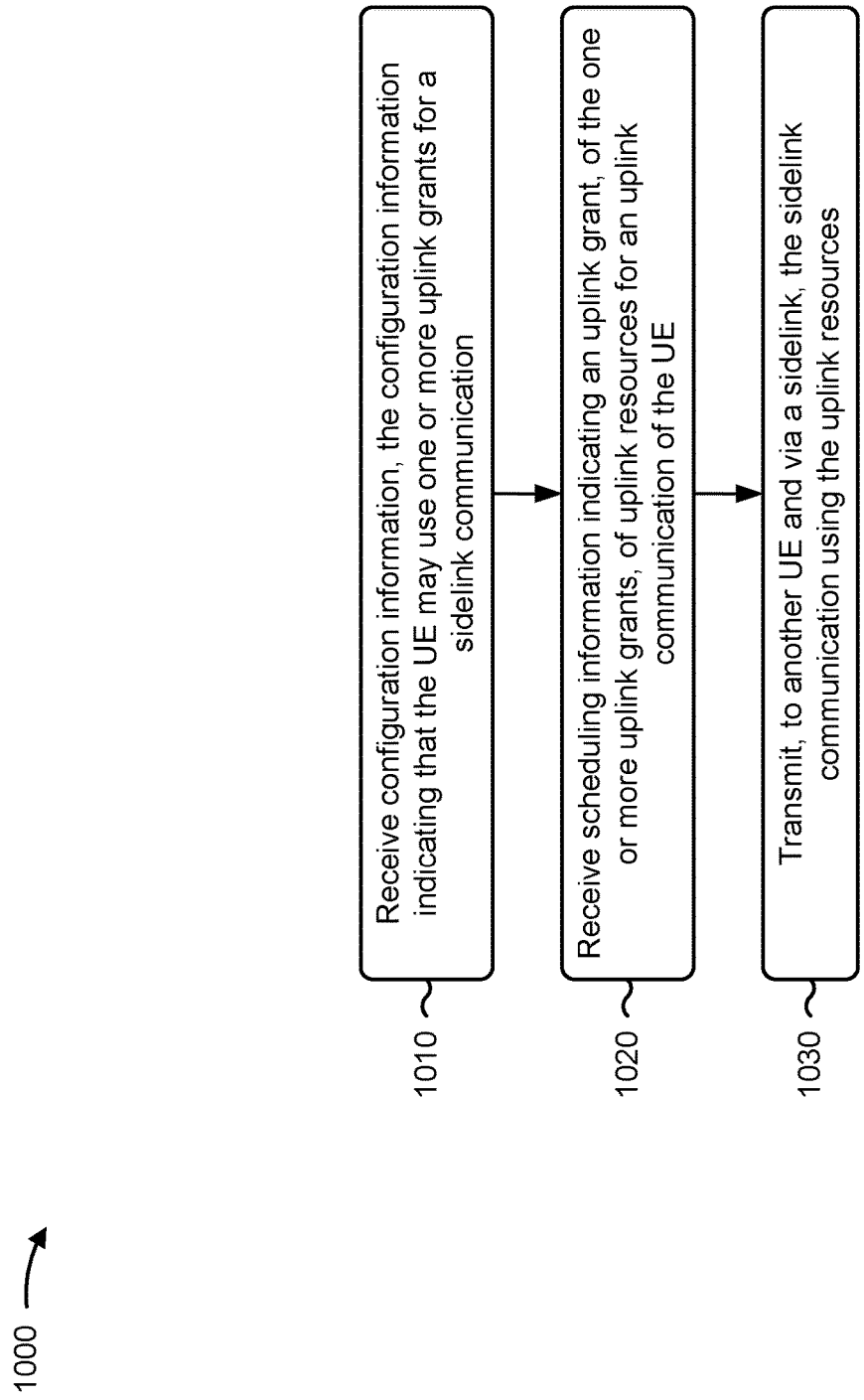
FIGS. 10 and 11 are diagrams illustrating example processes associated with sidelink communication using uplink resources, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with sidelink communication using uplink resources.

As shown in FIG. 10, in some aspects, process 1000 may include receiving configuration information, the configuration information indicating that the UE may use one or more uplink grants for a sidelink communication (block 1010). For example, the UE (e.g., using communication manager 140 and/or reception component 1202, depicted in FIG. 12) may receive configuration information, the configuration information indicating that the UE may use one or more uplink grants for a sidelink communication, as described above.

As further shown in FIG. 10, in some aspects, process 1000 may include receiving scheduling information indicating an uplink grant, of the one or more uplink grants, of uplink resources for an uplink communication of the UE (block 1020). For example, the UE (e.g., using communication manager 140 and/or reception component 1202, depicted in FIG. 12) may receive scheduling information indicating an uplink grant, of the one or more uplink grants, of uplink resources for an uplink communication of the UE, as described above.

As further shown in FIG. 10, in some aspects, process 1000 may include transmitting, to another UE and via a sidelink, the sidelink communication using the uplink resources (block 1030). For example, the UE (e.g., using communication manager 140 and/or transmission component 1204, depicted in FIG. 12) may transmit, to another UE and via a sidelink, the sidelink communication using the uplink resources, as described above.

Process 1000 may include additional aspects, such as any single aspect or any combination of aspects described below and/or in connection with one or more other processes described elsewhere herein.

In a first aspect, the configuration information further indicates one or more conditions, and transmitting the sidelink communication comprises transmitting the sidelink communication based at least in part on satisfaction of at least one of the one or more conditions.

In a second aspect, alone or in combination with the first aspect, the one or more conditions comprise that a sidelink priority associated with the sidelink communication satisfies a threshold priority, that the uplink resources are within one slot of sidelink resources for other sidelink communications with the other UE, that the uplink resources are not for re-transmission of the uplink communication, that sidelink packet preparation time satisfies a threshold preparation time, that the uplink resources or the uplink communication have not been indicated as canceled, or that the uplink communication does not include a reference signal transmission.

In a third aspect, alone or in combination with one or more of the first and second aspects, process 1000 includes determining, prior to the transmitting and based at least in part on the one or more conditions, that the one or more conditions have been satisfied.

In a fourth aspect, alone or in combination with one or more of the first through third aspects, process 1000 includes transmitting feedback indicating that the uplink grant is used for the sidelink communication.

In a fifth aspect, alone or in combination with one or more of the first through fourth aspects, the configuration information further indicates feedback resources for the feedback.

In a sixth aspect, alone or in combination with one or more of the first through fifth aspects, process 1000 includes canceling the uplink communication.

In a seventh aspect, alone or in combination with one or more of the first through sixth aspects, process 1000 includes determining a HARQ process number for the sidelink communication, and transmitting the sidelink communication comprises transmitting the sidelink communication in association with the HARQ process number.

In an eighth aspect, alone or in combination with one or more of the first through seventh aspects, determining the HARQ process number comprises determining the HARQ process number based at least in part on a HARQ indication included in the configuration information.

In a ninth aspect, alone or in combination with one or more of the first through eighth aspects, process 1000 includes reserving a set of HARQ process numbers for the sidelink communication, and determining the HARQ process number comprises selecting the HARQ process number from the set of HARQ process numbers.

In a tenth aspect, alone or in combination with one or more of the first through ninth aspects, process 1000 includes transmitting, to a network entity associated with the uplink grant, data indicating the HARQ process number.

In an eleventh aspect, alone or in combination with one or more of the first through tenth aspects, process 1000 includes transmitting a request for resources to be used for sidelink HARQ feedback associated with the sidelink communication.

In a twelfth aspect, alone or in combination with one or more of the first through eleventh aspects, process 1000 includes receiving a second grant after transmitting the sidelink communication, the second grant comprising at least one of a sidelink grant for further sidelink communication, or another uplink grant for re-transmission of the uplink communication.

In a thirteenth aspect, alone or in combination with one or more of the first through twelfth aspects, the scheduling information is included in downlink control information.

In a fourteenth aspect, alone or in combination with one or more of the first through thirteenth aspects, the scheduling information is included in radio resource control information.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
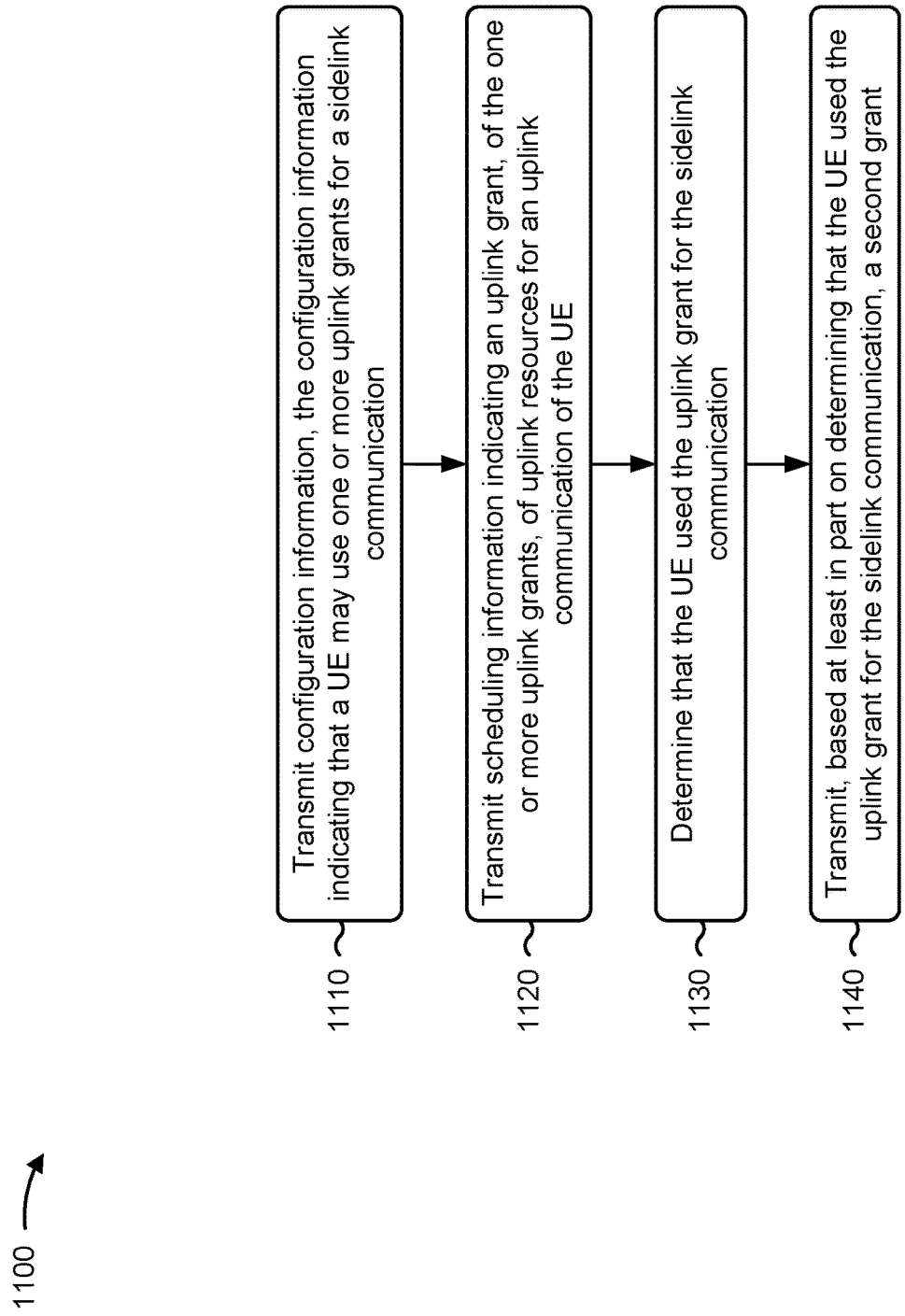

FIG. 11 is a diagram illustrating an example process 1100 performed, for example, by a network entity, in accordance with the present disclosure. Example process 1100 is an example where the network entity (e.g., base station 110) performs operations associated with sidelink communication using uplink resources.

As shown in FIG. 11, in some aspects, process 1100 may include transmitting configuration information, the configuration information indicating that a UE may use one or more uplink grants for a sidelink communication (block 1110). For example, the network entity (e.g., using communication manager 150 and/or transmission component 1304, depicted in FIG. 13) may transmit configuration information, the configuration information indicating that a UE may use one or more uplink grants for a sidelink communication, as described above.

As further shown in FIG. 11, in some aspects, process 1100 may include transmitting scheduling information indicating an uplink grant, of the one or more uplink grants, of uplink resources for an uplink communication of the UE (block 1120). For example, the network entity (e.g., using communication manager 150 and/or transmission component 1304, depicted in FIG. 13) may transmit scheduling information indicating an uplink grant, of the one or more uplink grants, of uplink resources for an uplink communication of the UE, as described above.

As further shown in FIG. 11, in some aspects, process 1100 may include determining that the UE used the uplink grant for the sidelink communication (block 1130). For example, the network entity (e.g., using communication manager 150 and/or determination component 1308, depicted in FIG. 13) may determine that the UE used the uplink grant for the sidelink communication, as described above.

As further shown in FIG. 11, in some aspects, process 1100 may include transmitting, based at least in part on determining that the UE used the uplink grant for the sidelink communication, a second grant (block 1140). For example, the network entity (e.g., using communication manager 150 and/or transmission component 1304, depicted in FIG. 13) may transmit, based at least in part on determining that the UE used the uplink grant for the sidelink communication, a second grant, as described above.

Process 1100 may include additional aspects, such as any single aspect or any combination of aspects described below and/or in connection with one or more other processes described elsewhere herein.

In a first aspect, the configuration information further indicates one or more conditions indicating that transmission of the sidelink communication using the uplink grant is based at least in part on satisfaction of at least one of the one or more conditions.

In a second aspect, alone or in combination with the first aspect, the one or more conditions comprise that a sidelink priority associated with the sidelink communication satisfies a threshold priority, that the uplink resources are within one slot of sidelink resources for other sidelink communications with another UE, that the uplink resources are not for re-transmission of the uplink communication, that sidelink packet preparation time satisfies a threshold preparation time, that the uplink resources or the uplink communication have not been indicated as canceled, or that the uplink communication does not include a reference signal transmission.

In a third aspect, alone or in combination with one or more of the first and second aspects, process 1100 includes transmitting data indicating feedback resources for the UE to provide feedback indicating that the uplink grant was used for the sidelink communication.

In a fourth aspect, alone or in combination with one or more of the first through third aspects, the scheduling information further indicates the feedback resources.

In a fifth aspect, alone or in combination with one or more of the first through fourth aspects, the configuration information further indicates the feedback resources.

In a sixth aspect, alone or in combination with one or more of the first through fifth aspects, determining that the UE used the uplink grant for the sidelink communication comprises determining that the UE used the uplink grant for the sidelink communication based at least in part on receiving the feedback.

In a seventh aspect, alone or in combination with one or more of the first through sixth aspects, determining that the UE used the uplink grant for the sidelink communication comprises measuring a signal strength associated with the uplink resources, and determining that the UE used the uplink grant for the sidelink communication based at least in part on the signal strength.

In an eighth aspect, alone or in combination with one or more of the first through seventh aspects, determining that the UE used the uplink grant for the sidelink communication comprises attempting to decode the sidelink communication, and determining that the UE used the uplink grant for the sidelink communication based at least in part on attempting to decode the sidelink communication.

In a ninth aspect, alone or in combination with one or more of the first through eighth aspects, the configuration information further indicates one or more HARQ process numbers reserved for the sidelink communication.

In a tenth aspect, alone or in combination with one or more of the first through ninth aspects, process 1100 includes receiving a request for HARQ resources to be used for sidelink HARQ feedback in association with the sidelink communication, and transmitting, based at least in part on the request, data indicating the HARQ resources.

In an eleventh aspect, alone or in combination with one or more of the first through tenth aspects, the second grant comprises at least one of a sidelink grant for further sidelink communication, or another uplink grant for re-transmission of the uplink communication.

In a twelfth aspect, alone or in combination with one or more of the first through eleventh aspects, the scheduling information is included in downlink control information.

In a thirteenth aspect, alone or in combination with one or more of the first through twelfth aspects, the scheduling information is included in radio resource control information.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
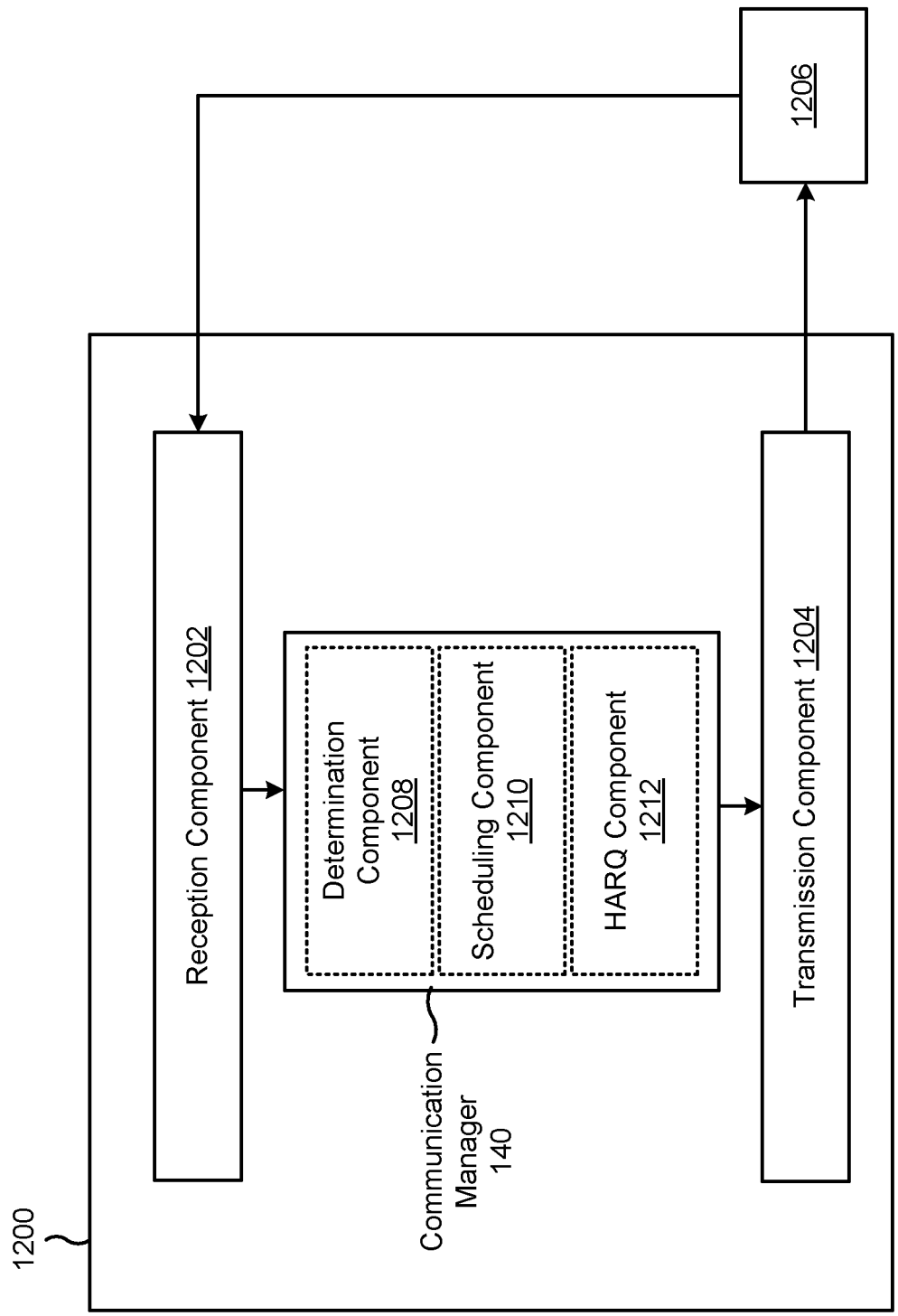
FIGS. 12 and 13 are diagrams of example apparatuses for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include one or more of a determination component 1208, a scheduling component 1210, or a HARQ component 1212, among other examples.

In some aspects, the apparatus 1200 may be configured to perform one or more operations described herein in connection with FIGS. 4-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive configuration information, the configuration information indicating that the UE may use one or more uplink grants for a sidelink communication. The reception component 1202 may receive scheduling information indicating an uplink grant, of the one or more uplink grants, of uplink resources for an uplink communication of the UE. The transmission component 1204 may transmit, to another UE and via a sidelink, the sidelink communication using the uplink resources.

The determination component 1208 may determine, prior to the transmitting and based at least in part on the one or more conditions, that the one or more conditions have been satisfied.

The transmission component 1204 may transmit feedback indicating that the uplink grant is used for the sidelink communication.

The scheduling component 1210 may cancel the uplink communication.

The determination component 1208 may determine a HARQ process number for the sidelink communication.

The HARQ component 1212 may reserve a set of HARQ process numbers for the sidelink communication.

The transmission component 1204 may transmit, to a network entity associated with the uplink grant, data indicating the HARQ process number.

The transmission component 1204 may transmit a request for resources to be used for sidelink HARQ feedback associated with the sidelink communication.

The reception component 1202 may receive a second grant after transmitting the sidelink communication, the second grant comprising at least one of a sidelink grant for further sidelink communication, or another uplink grant for re-transmission of the uplink communication.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
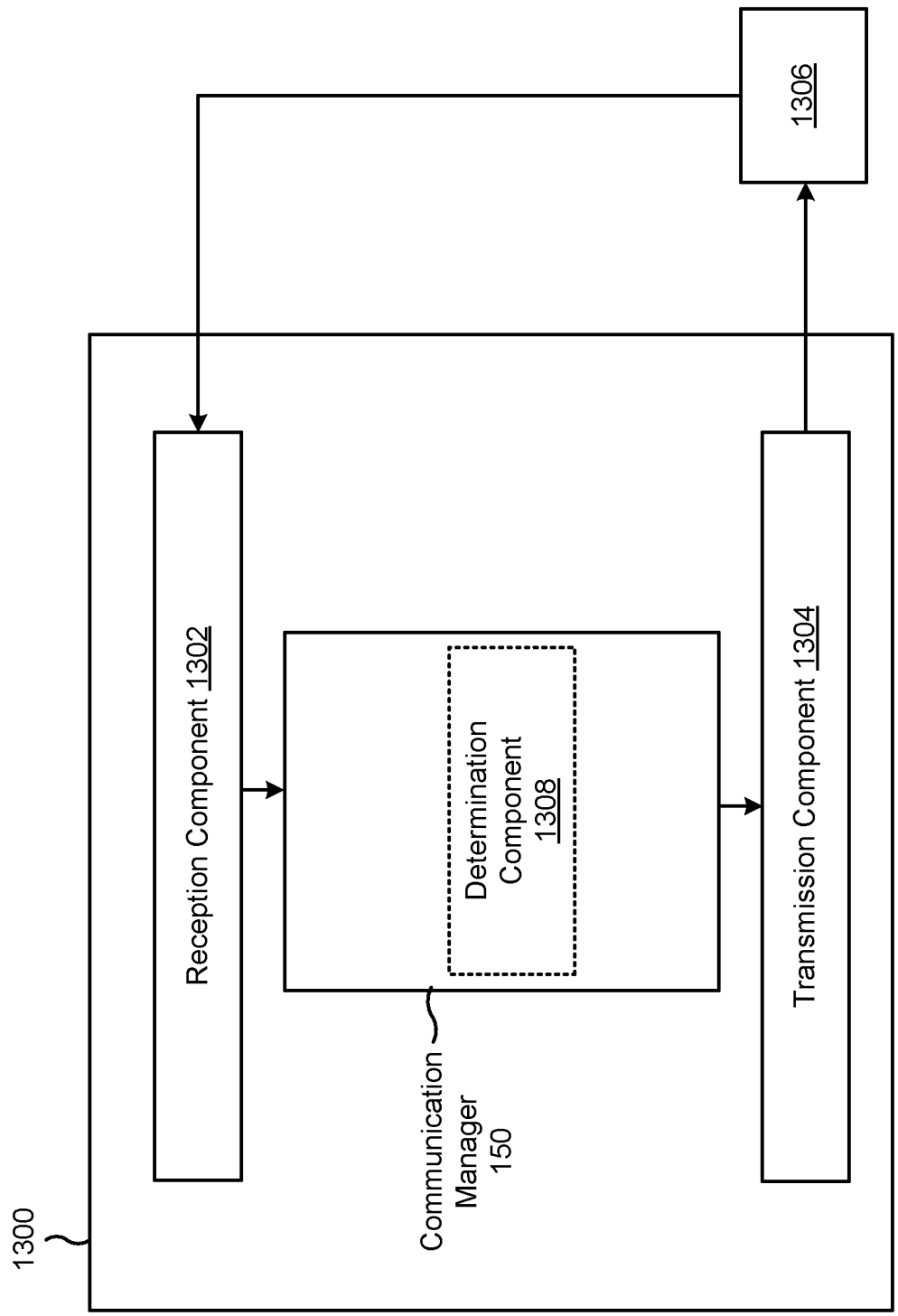

FIG. 13 is a diagram of an example apparatus 1300 for wireless communication. The apparatus 1300 may be a network entity, or a network entity may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150) may include a determination component 1308, among other examples.

In some aspects, the apparatus 1300 may be configured to perform one or more operations described herein in connection with FIGS. 4-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network entity described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network entity described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network entity described in connection with FIG. 2. In some aspects, the transmission component 1304 may be co-located with the reception component 1302 in a transceiver.

The transmission component 1304 may transmit configuration information, the configuration information indicating that a UE may use one or more uplink grants for a sidelink communication. The transmission component 1304 may transmit scheduling information indicating an uplink grant, of the one or more uplink grants, of uplink resources for an uplink communication of the UE. The determination component 1308 may determine that the UE used the uplink grant for the sidelink communication. The transmission component 1304 may transmit, based at least in part on determining that the UE used the uplink grant for the sidelink communication, a second grant.

The transmission component 1304 may transmit data indicating feedback resources for the UE to provide feedback indicating that the uplink grant was used for the sidelink communication.

The reception component 1302 may receive a request for HARQ resources to be used for sidelink HARQ feedback in association with the sidelink communication.

The transmission component 1304 may transmit, based at least in part on the request, data indicating the HARQ resources.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a UE, comprising: receiving configuration information, the configuration information indicating that the UE may use one or more uplink grants for a sidelink communication; receiving scheduling information indicating an uplink grant, of the one or more uplink grants, of uplink resources for an uplink communication of the UE; and transmitting, to another UE and via a sidelink, the sidelink communication using the uplink resources.

Aspect 2: The method of Aspect 1, wherein the configuration information further indicates one or more conditions; and wherein transmitting the sidelink communication comprises: transmitting the sidelink communication based at least in part on satisfaction of at least one of the one or more conditions.

Aspect 3: The method of Aspect 2, wherein the one or more conditions comprise: a sidelink priority associated with the sidelink communication satisfies a threshold priority; the uplink resources are within one slot of sidelink resources for other sidelink communications with the other UE; the uplink resources are not for re-transmission of the uplink communication; sidelink packet preparation time satisfies a threshold preparation time; the uplink resources or the uplink communication have not been indicated as canceled; or the uplink communication does not include a reference signal transmission.

Aspect 4: The method of any of Aspects 2-3, further comprising: determining, prior to the transmitting and based at least in part on the one or more conditions, that the one or more conditions have been satisfied.

Aspect 5: The method of any of Aspects 1-4, further comprising: transmitting feedback indicating that the uplink grant is used for the sidelink communication.

Aspect 6: The method of Aspect 5, wherein the configuration information further indicates feedback resources for the feedback.

Aspect 7: The method of any of Aspects 1-6, further comprising: canceling the uplink communication.

Aspect 8: The method of any of Aspects 1-7, further comprising: determining a HARQ process number for the sidelink communication; and wherein transmitting the sidelink communication comprises: transmitting the sidelink communication in association with the HARQ process number.

Aspect 9: The method of Aspect 8, wherein determining the HARQ process number comprises: determining the HARQ process number based at least in part on a HARQ indication included in the configuration information.

Aspect 10: The method of any of Aspects 8-9, further comprising: reserving a set of HARQ process numbers for the sidelink communication; and wherein determining the HARQ process number comprises: selecting the HARQ process number from the set of HARQ process numbers.

Aspect 11: The method of any of Aspects 8-10, further comprising: transmitting, to a network entity associated with the uplink grant, data indicating the HARQ process number.

Aspect 12: The method of any of Aspects 1-11, further comprising: transmitting a request for resources to be used for sidelink HARQ feedback associated with the sidelink communication.

Aspect 13: The method of any of Aspects 1-12, further comprising: receiving a second grant after transmitting the sidelink communication, the second grant comprising at least one of: a sidelink grant for further sidelink communication, or another uplink grant for re-transmission of the uplink communication.

Aspect 14: The method of any of Aspects 1-13, wherein the scheduling information is included in downlink control information.

Aspect 15: The method of any of Aspects 1-14, wherein the scheduling information is included in radio resource control information.

Aspect 16: A method of wireless communication performed by a network entity, comprising: transmitting configuration information, the configuration information indicating that a UE may use one or more uplink grants for a sidelink communication; transmitting scheduling information indicating an uplink grant, of the one or more uplink grants, of uplink resources for an uplink communication of the UE; determining that the UE used the uplink grant for the sidelink communication; and transmitting, based at least in part on determining that the UE used the uplink grant for the sidelink communication, a second grant.

Aspect 17: The method of Aspect 16, wherein the configuration information further indicates one or more conditions indicating that transmission of the sidelink communication using the uplink grant is based at least in part on satisfaction of at least one of the one or more conditions.

Aspect 18: The method of Aspect 17, wherein the one or more conditions comprise: a sidelink priority associated with the sidelink communication satisfies a threshold priority; the uplink resources are within one slot of sidelink resources for other sidelink communications with another UE; the uplink resources are not for re-transmission of the uplink communication; sidelink packet preparation time satisfies a threshold preparation time; the uplink resources or the uplink communication have not been indicated as canceled; or the uplink communication does not include a reference signal transmission.

Aspect 19: The method of any of Aspects 16-18, further comprising: transmitting data indicating feedback resources for the UE to provide feedback indicating that the uplink grant was used for the sidelink communication.

Aspect 20: The method of Aspect 19, wherein the scheduling information further indicates the feedback resources.

Aspect 21: The method of Aspect 19, wherein the configuration information further indicates the feedback resources.

Aspect 22: The method of any of Aspects 19-21, wherein determining that the UE used the uplink grant for the sidelink communication comprises: determining that the UE used the uplink grant for the sidelink communication based at least in part on receiving the feedback.

Aspect 23: The method of any of Aspects 16-22, wherein determining that the UE used the uplink grant for the sidelink communication comprises: measuring a signal strength associated with the uplink resources; and determining that the UE used the uplink grant for the sidelink communication based at least in part on the signal strength.

Aspect 24: The method of any of Aspects 16-23, wherein determining that the UE used the uplink grant for the sidelink communication comprises: attempting to decode the sidelink communication; and determining that the UE used the uplink grant for the sidelink communication based at least in part on attempting to decode the sidelink communication.

Aspect 25: The method of any of Aspects 16-24, wherein the configuration information further indicates one or more HARQ process numbers reserved for the sidelink communication.

Aspect 26: The method of any of Aspects 16-25, further comprising: receiving a request for HARQ resources to be used for sidelink HARQ feedback in association with the sidelink communication; and transmitting, based at least in part on the request, data indicating the HARQ resources.

Aspect 27: The method of any of Aspects 16-26, wherein the second grant comprises at least one of: a sidelink grant for further sidelink communication, or another uplink grant for re-transmission of the uplink communication.

Aspect 28: The method of any of Aspects 16-27, wherein the scheduling information is included in downlink control information.

Aspect 29: The method of any of Aspects 16-28, wherein the scheduling information is included in radio resource control information.

Aspect 30: An apparatus for wireless communication at a device, comprising a processor; memory coupled with the processor; and instructions stored in the memory and executable by the processor to cause the apparatus to perform the method of one or more of Aspects 1-15.

Aspect 31: An apparatus for wireless communication at a device, comprising a processor; memory coupled with the processor; and instructions stored in the memory and executable by the processor to cause the apparatus to perform the method of one or more of Aspects 16-29.

Aspect 32: A device for wireless communication, comprising a memory and one or more processors coupled to the memory, the one or more processors configured to perform the method of one or more of Aspects 1-15.

Aspect 33: A device for wireless communication, comprising a memory and one or more processors coupled to the memory, the one or more processors configured to perform the method of one or more of Aspects 16-29.

Aspect 34: An apparatus for wireless communication, comprising at least one means for performing the method of one or more of Aspects 1-15.

Aspect 35: An apparatus for wireless communication, comprising at least one means for performing the method of one or more of Aspects 16-29.

Aspect 36: A non-transitory computer-readable medium storing code for wireless communication, the code comprising instructions executable by a processor to perform the method of one or more of Aspects 1-15.

Aspect 37: A non-transitory computer-readable medium storing code for wireless communication, the code comprising instructions executable by a processor to perform the method of one or more of Aspects 16-29.

Aspect 38: A non-transitory computer-readable medium storing a set of instructions for wireless communication, the set of instructions comprising one or more instructions that, when executed by one or more processors of a device, cause the device to perform the method of one or more of Aspects 1-15.

Aspect 39: A non-transitory computer-readable medium storing a set of instructions for wireless communication, the set of instructions comprising one or more instructions that, when executed by one or more processors of a device, cause the device to perform the method of one or more of Aspects 16-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive configuration information, the configuration information indicating that the UE may use one or more uplink grants for a sidelink communication;
receive scheduling information indicating an uplink grant, of the one or more uplink grants, of uplink resources for an uplink communication of the UE; and
transmit, to another UE and via a sidelink, the sidelink communication using the uplink resources.

2. The UE of claim 1, wherein the configuration information further indicates one or more conditions; and
wherein the one or more processors, to transmit the sidelink communication, are configured to:
transmit the sidelink communication based at least in part on satisfaction of at least one of the one or more conditions.

3. The UE of claim 2, wherein the one or more conditions comprise:
a sidelink priority associated with the sidelink communication satisfies a threshold priority;
the uplink resources are within one slot of sidelink resources for other sidelink communications with the other UE;
the uplink resources are not for re-transmission of the uplink communication;
sidelink packet preparation time satisfies a threshold preparation time;
the uplink resources or the uplink communication have not been indicated as canceled; or
the uplink communication does not include a reference signal transmission.

4. The UE of claim 2, wherein the one or more processors are further configured to:
determine, prior to the transmitting and based at least in part on the one or more conditions, that the one or more conditions have been satisfied.

5. The UE of claim 1, wherein the one or more processors are further configured to:
transmit feedback indicating that the uplink grant is used for the sidelink communication.

6. The UE of claim 5, wherein the configuration information further indicates feedback resources for the feedback.

7. The UE of claim 1, wherein the one or more processors are further configured to:
cancel the uplink communication.

8. The UE of claim 1, wherein the one or more processors are further configured to:
determine a hybrid automatic repeat request (HARQ) process number for the sidelink communication; and
wherein the one or more processors, to transmit the sidelink communication, are configured to:
transmit the sidelink communication in association with the HARQ process number.

9. The UE of claim 8, wherein the one or more processors, to determine the HARQ process number, are configured to:
determine the HARQ process number based at least in part on a HARQ indication included in the configuration information.

10. The UE of claim 8, wherein the one or more processors are further configured to:
reserve a set of HARQ process numbers for the sidelink communication; and
wherein the one or more processors, to determine the HARQ process number, are configured to:
select the HARQ process number from the set of HARQ process numbers.

11. The UE of claim 8, wherein the one or more processors are further configured to:
transmit, to a network entity associated with the uplink grant, data indicating the HARQ process number.

12. The UE of claim 1, wherein the one or more processors are further configured to:
transmit a request for resources to be used for sidelink HARQ feedback associated with the sidelink communication.

13. The UE of claim 1, wherein the one or more processors are further configured to:
receive a second grant after transmitting the sidelink communication, the second grant comprising at least one of:
a sidelink grant for further sidelink communication, or
another uplink grant for re-transmission of the uplink communication.

14. The UE of claim 1, wherein the scheduling information is included in downlink control information.

15. The UE of claim 1, wherein the scheduling information is included in radio resource control information.

16. A network entity for wireless communication, comprising:
a memory; and
one or more processors, coupled to the memory, configured to:
transmit configuration information, the configuration information indicating that a user equipment (UE) may use one or more uplink grants for a sidelink communication;
transmit scheduling information indicating an uplink grant, of the one or more uplink grants, of uplink resources for an uplink communication of the UE;
determine that the UE used the uplink grant for the sidelink communication; and
transmit, based at least in part on determining that the UE used the uplink grant for the sidelink communication, a second grant.

17. The network entity of claim 16, wherein the configuration information further indicates one or more conditions indicating that transmission of the sidelink communication using the uplink grant is based at least in part on satisfaction of at least one of the one or more conditions.

18. The network entity of claim 17, wherein the one or more conditions comprise:
a sidelink priority associated with the sidelink communication satisfies a threshold priority;
the uplink resources are within one slot of sidelink resources for other sidelink communications with another UE;
the uplink resources are not for re-transmission of the uplink communication;
sidelink packet preparation time satisfies a threshold preparation time;
the uplink resources or the uplink communication have not been indicated as canceled; or
the uplink communication does not include a reference signal transmission.

19. The network entity of claim 16, wherein the one or more processors are further configured to:
transmit data indicating feedback resources for the UE to provide feedback indicating that the uplink grant was used for the sidelink communication.

20. The network entity of claim 19, wherein the scheduling information further indicates the feedback resources.

21. The network entity of claim 19, wherein the configuration information further indicates the feedback resources.

22. The network entity of claim 19, wherein the one or more processors, to determine that the UE used the uplink grant for the sidelink communication, are configured to:
determine that the UE used the uplink grant for the sidelink communication based at least in part on receiving the feedback.

23. The network entity of claim 16, wherein the one or more processors, to determine that the UE used the uplink grant for the sidelink communication, are configured to:
measure a signal strength associated with the uplink resources; and
determine that the UE used the uplink grant for the sidelink communication based at least in part on the signal strength.

24. The network entity of claim 16, wherein the one or more processors, to determine that the UE used the uplink grant for the sidelink communication, are configured to:
attempt to decode the sidelink communication; and
determine that the UE used the uplink grant for the sidelink communication based at least in part on attempting to decode the sidelink communication.

25. The network entity of claim 16, wherein the configuration information further indicates one or more hybrid automatic repeat request (HARQ) process numbers reserved for the sidelink communication.

26. The network entity of claim 16, wherein the one or more processors are further configured to:
receive a request for hybrid automatic repeat request (HARQ) resources to be used for sidelink HARQ feedback in association with the sidelink communication; and
transmit, based at least in part on the request, data indicating the HARQ resources.

27. The network entity of claim 16, wherein the second grant comprises at least one of:
a sidelink grant for further sidelink communication, or
another uplink grant for re-transmission of the uplink communication.

28. The network entity of claim 16, wherein the scheduling information is included in at least one of:
downlink control information, or
radio resource control information.

29. A method of wireless communication performed by a user equipment (UE), comprising:
receiving configuration information, the configuration information indicating that the UE may use one or more uplink grants for a sidelink communication;
receiving scheduling information indicating an uplink grant, of the one or more uplink grants, of uplink resources for an uplink communication of the UE; and
transmitting, to another UE and via a sidelink, the sidelink communication using the uplink resources.

30. A method of wireless communication performed by a network entity, comprising:
transmitting configuration information, the configuration information indicating that a user equipment (UE) may use one or more uplink grants for a sidelink communication;
transmitting scheduling information indicating an uplink grant, of the one or more uplink grants, of uplink resources for an uplink communication of the UE;
determining that the UE used the uplink grant for the sidelink communication; and
transmitting, based at least in part on determining that the UE used the uplink grant for the sidelink communication, a second grant.

* * * * *